United States Patent
Yu et al.

(10) Patent No.: US 8,667,162 B2
(45) Date of Patent: Mar. 4, 2014

(54) METHOD, APPARATUS AND COMPUTER PROGRAM PRODUCT FOR PROVIDING A MOBILE STREAMING ADAPTOR

(75) Inventors: Jen-Yu Yu, Fengyuan (TW); Hsin-Hua Lee, Yongkang (TW); Chong-Yie Chang, Changhua (TW); Yeh-Kai Chou, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 12/346,992

(22) Filed: Dec. 31, 2008

(65) Prior Publication Data

US 2010/0169808 A1  Jul. 1, 2010

(51) Int. Cl.
*G06F 15/16* (2006.01)
*G06F 15/173* (2006.01)
*H04L 29/06* (2006.01)

(52) U.S. Cl.
CPC ..... *H04L 29/06027* (2013.01); *H04L 29/06523* (2013.01)
USPC ........... 709/231; 709/200; 709/201; 709/202; 709/203; 709/217; 709/218; 709/219; 709/220; 709/221; 709/222; 709/223; 709/224; 709/225; 709/226; 709/227; 709/228; 709/229; 709/230; 709/232; 709/236; 709/237; 709/238; 709/245; 709/246; 709/248; 709/249; 348/14.01; 348/14.02; 348/14.03; 348/14.04; 348/14.05; 348/14.06; 348/14.07; 348/14.08; 348/14.09; 348/14.1; 348/14.11; 348/14.12; 348/14.13; 348/14.14; 348/14.15; 348/14.16; 725/105; 715/764

(58) Field of Classification Search
USPC ......... 709/217, 219, 218, 220, 221, 222, 223, 709/224, 225, 226, 227, 228, 229, 230, 231, 709/232, 236, 237, 238, 245, 246, 248, 249, 709/200, 201, 202, 203; 725/105; 715/764; 348/14.01, 14.02, 14.03, 14.05, 14.04, 348/14.06, 14.07, 14.08, 14.09, 14.1, 14.11, 348/14.12, 14.13, 14.14, 14.15, 14.16
See application file for complete search history.

(56) References Cited

U.S. PATENT DOCUMENTS

| | | | |
|---|---|---|---|
| 5,949,484 A | 9/1999 | Nakaya et al. | |
| 6,405,256 B1 * | 6/2002 | Lin et al. | 709/231 |
| 6,757,684 B2 | 6/2004 | Svendsen et al. | |
| 6,959,221 B1 | 10/2005 | Kataoka | |
| 7,221,386 B2 * | 5/2007 | Thacher et al. | 348/14.02 |
| 7,249,370 B2 * | 7/2007 | Kodama et al. | 726/3 |
| 7,386,597 B2 | 6/2008 | Takeuchi et al. | |
| 7,461,094 B2 | 12/2008 | Morris et al. | |
| 7,536,641 B2 | 5/2009 | Rosenstein et al. | |
| 7,554,576 B2 * | 6/2009 | Erol et al. | 348/211.3 |

(Continued)

FOREIGN PATENT DOCUMENTS

WO   WO 2007/074946 A1   7/2007

*Primary Examiner* — Saket K Daftuar
(74) *Attorney, Agent, or Firm* — Alston & Bird LLP (57) ABSTRACT

An apparatus for providing a mobile streaming adaptor includes a processor configured to receive media content from a remote camera, process the received media content by capturing, encoding and encapsulating the media content at a mobile electronic device, connect to a remote streaming server through function of a mobile networked device; and stream the encapsulated media content to the mobile networked device for communication of the encapsulated content to the remote streaming server through an Internet Protocol (IP) network for real-time distribution to a communication device. A corresponding computer program product and method are also provided.

26 Claims, 6 Drawing Sheets

(56) References Cited

U.S. PATENT DOCUMENTS

| | | | |
|---|---|---|---|
| 7,567,671 B2* | 7/2009 | Gupte | 380/239 |
| 7,571,253 B2* | 8/2009 | Lee | 709/247 |
| 7,587,738 B2* | 9/2009 | Nakamura et al. | 725/105 |
| 7,593,945 B2* | 9/2009 | DaCosta | 1/1 |
| 7,890,599 B2* | 2/2011 | Kalmanje et al. | 709/217 |
| 8,144,182 B2* | 3/2012 | Shoemake et al. | 348/14.04 |
| 8,233,027 B2* | 7/2012 | Cheng et al. | 348/14.08 |
| 2002/0122434 A1 | 9/2002 | Ido et al. | |
| 2002/0188699 A1* | 12/2002 | Ullman et al. | 709/219 |
| 2003/0128272 A1* | 7/2003 | Clough et al. | 348/14.02 |
| 2003/0177255 A1 | 9/2003 | Yun | |
| 2004/0003151 A1* | 1/2004 | Bateman et al. | 710/72 |
| 2004/0111476 A1 | 6/2004 | Trossen et al. | |
| 2005/0021622 A1 | 1/2005 | Cullen | |
| 2005/0043057 A1 | 2/2005 | Lo | |
| 2005/0095981 A1 | 5/2005 | Benco | |
| 2005/0125838 A1 | 6/2005 | Wang et al. | |
| 2005/0273489 A1 | 12/2005 | Pecht et al. | |
| 2006/0045057 A1 | 3/2006 | Nylander et al. | |
| 2006/0073795 A1 | 4/2006 | Mayblum et al. | |
| 2007/0143502 A1 | 6/2007 | Garcia-Martin et al. | |
| 2007/0180062 A1* | 8/2007 | Southerland et al. | 709/219 |
| 2007/0192814 A1* | 8/2007 | Southerland et al. | 725/105 |
| 2007/0288651 A1* | 12/2007 | Nassor et al. | 709/231 |
| 2008/0117975 A1* | 5/2008 | Sasai et al. | 375/240.16 |
| 2008/0288986 A1* | 11/2008 | Foster et al. | 725/62 |
| 2009/0066795 A1* | 3/2009 | Wollmershauser et al. | 348/159 |
| 2009/0196182 A1* | 8/2009 | Barnett et al. | 370/236.1 |
| 2009/0228569 A1* | 9/2009 | Kalmanje et al. | 709/217 |
| 2010/0066804 A1* | 3/2010 | Shoemake et al. | 348/14.02 |
| 2010/0124271 A1* | 5/2010 | Martz et al. | 375/240.01 |
| 2011/0050843 A1* | 3/2011 | Cheng et al. | 348/14.08 |

* cited by examiner

METHOD, APPARATUS AND COMPUTER PROGRAM PRODUCT FOR PROVIDING A MOBILE STREAMING ADAPTOR

FIELD OF INVENTION

The present invention relates generally to real-time media communication and, more particularly, to a method, apparatus and computer program product for providing a mobile streaming adaptor.

BACKGROUND

Embodiments of the present invention relate generally to a method, apparatus and computer program product for providing a mobile streaming adaptor. As such, some embodiments may provide a service-oriented device capable of cooperating with a mobile communication device (e.g., a mobile telephone) to provide relatively high-quality media processing services to support real-time media streaming.

The continued growth in communications technologies and the emergence of the Internet as means for accessing data has accelerated the demand for publishing or sharing information over communication networks. The information, which may include audio, video, audio/video, or other content, may be transmitted over the communication networks and may be transmitted from or received by mobile devices such as mobile phones, digital cameras, digital video cameras, digital players, personal digital assistants (PDAs) and mobile terminals. These mobile devices may perform various functions and may be able to communicate via wireless connections with other devices. For example, a single mobile device may provide Internet access, maintain a personal calendar, provide mobile telephony, and take digital photographs.

The editing and sharing of media content captured by a mobile device may be time-consuming and limited. As used herein, "media content" may refer to one or more content items, files, or bitstreams, including audio, video, text, graphics, or other media or any combination thereof. In the past, media content production and distribution had been somewhat monopolized by professional companies because capture, editing, post-production, and distribution were typically relatively expensive tasks that required specialized equipment. However, as the cost of media capture or playback devices such as digital video cameras has decreased, the popularity and accessibility of networks has increased, and more bandwidth has been made available to average users, streaming media content has become a widespread video distribution solution. Streaming media content solutions have evolved from applications and services that can now be offered to average users. In this regard, for example, current solutions have evolved from off-line methods, which include transforming pre-stored media content, into streaming data for real time distribution of live events.

A typical legacy distribution solution requires a personal computer (PC) or server and several peripherals to execute corresponding related tasks (e.g., media capture, compression, streaming packets encapsulation, streaming packets transmission and control). To make such systems simpler, some legacy systems have attempted to integrate all system components into one box, such as ViewCast's GoStream series. Such systems are often composed of some stand-alone devices that, when combined with other stand-alone devices, include functions for media capture, streaming encapsulation, a web server, and other functionality that may be desired all in one box.

With the recent rise in popularity of mobile networks and camera phones with relatively robust capabilities, streaming applications are no longer limited to use by professionals. However, there may still be a need for a relatively simple and ubiquitous streaming distribution service. One such service offered previously by the inventors of the present invention has been referred to as "Pocket Channel" and was described in U.S. patent application Ser. No. 11/944,218, which is incorporated herein by reference in its entirety. However, concerns that remain with many existing mobile network and/or camera phone based solutions relate to limitations in quality of optical components, quality of image sensor components, microphone or other audio components, battery life, computing power and the like. Even though better embedded processors and hardware encoders may partially alleviate these concerns in the future, audio/video encoding capability and some camera issues may remain difficult obstacles to overcome. Accordingly, it may be desirable to provide an improved mechanism for providing streaming video services.

BRIEF SUMMARY

Examples of the present invention may provide a system for overcoming at least some of the difficulties described above. In this regard, embodiments of the present invention may provide a streaming video service that is relatively simple, while maintaining advantages related to mobility and robust capability. For example, embodiments of the present invention may provide an external device (e.g., a mobile streaming adaptor) configured to enable attachment to a physically separate mobile networked device (e.g., a mobile phone) and a physically separate camera to distribute streaming content to a remote streaming service provider. As such, the high-quality video capturing characteristics of the physically separate camera may be utilized along with the network communication capability of the mobile networked device. However, processing of the video may be handled by the mobile streaming adaptor so that battery and processing resources of the other devices, and in particular the mobile networked device, may not be negatively impacted.

In an exemplary embodiment, an apparatus for providing a mobile streaming adaptor is provided. The apparatus may include a processor configured to receive media content from a remote camera, process the received media content by capturing, encoding and encapsulating the media content at a mobile electronic device, connect to a remote streaming server through function of a mobile networked device, and stream the encapsulated media content to the mobile networked device for communication of the encapsulated content to the remote streaming server through an Internet Protocol (IP) network for real-time distribution to a communication device.

In another exemplary embodiment, a method for providing a mobile streaming adaptor is provided. The method may include receiving media content from a remote camera, processing the received media content by capturing, encoding and encapsulating the media content at a mobile electronic device, connecting to a remote streaming server through function of a mobile networked device, and streaming the encapsulated media content to the mobile networked device for communication of the encapsulated content to the remote streaming server through an Internet Protocol (IP) network for real-time distribution to a communication device.

In an exemplary embodiment, a computer program product for providing a mobile streaming adaptor is provided. The computer program product includes at least one computer-readable storage medium having computer-executable program code instructions stored therein. The computer-executable program code instructions may include program code instructions for receiving media content from a remote camera, processing the received media content by capturing, encoding and encapsulating the media content at a mobile electronic device, connecting to a remote streaming server through function of a mobile networked device, and streaming the encapsulated media content to the mobile networked device for communication of the encapsulated content to the remote streaming server through an Internet Protocol (IP) network for real-time distribution to a communication device.

In an alternative embodiment, an apparatus for providing a mobile networked device is provided. The apparatus may include a controller configured to provide control commands to a mobile electronic device receiving media content from a remote camera regarding processing of the received media content at the mobile electronic device. The processing may include capturing, encoding and encapsulating the media content. The controller may be further configured to receive the processed media content, and stream the processed media content to a streaming server for real-time distribution to a communication device.

Additional features and advantages of embodiments of the present invention will be set forth in part in the description which follows, and in part will be obvious from the description, or may be learned by practice of embodiments of the invention. The features and advantages of embodiments of the invention will be realized and attained by the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating embodiments of the invention, there are shown in the drawings embodiments which are examples. It should be understood, however, that the invention is not limited to the precise arrangements and instrumentalities shown.

In the drawings.

DETAILED DESCRIPTION

Reference will now be made in detail to the present embodiments of the invention, examples of which are illustrated in the accompanying drawings. Wherever possible, the same reference numbers will be used throughout the drawings to refer to the same or like parts. As used herein, the terms "data," "content," "information" and similar terms may be used interchangeably to refer to data capable of being transmitted, received and/or stored in accordance with embodiments of the present invention. Moreover, the term "exemplary," as used herein, is not provided to convey any qualitative assessment, but instead merely to convey an illustration of an example. Thus, use of any such terms should not be taken to limit the spirit and scope of embodiments of the present invention.

Figure 1:
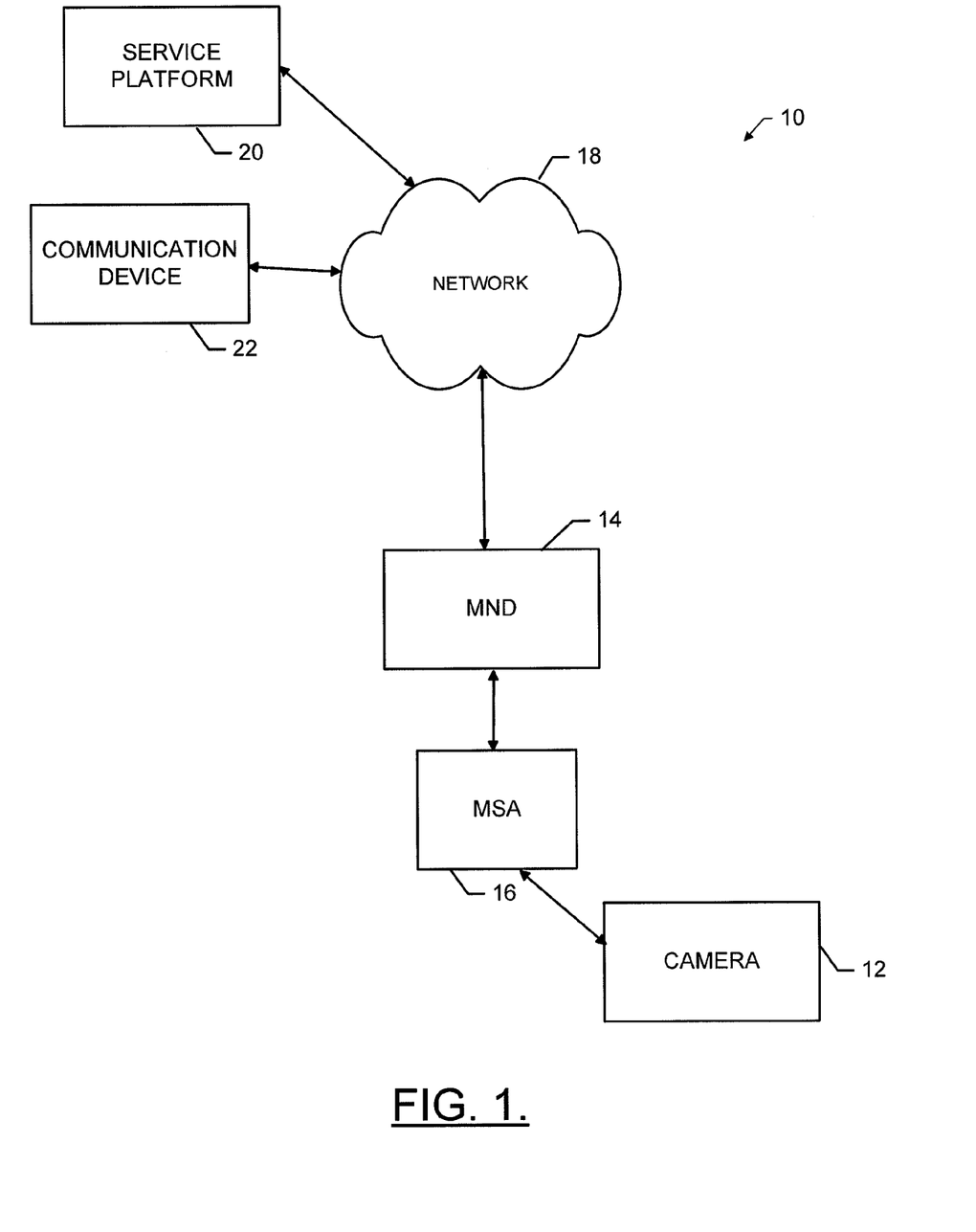
FIG. 1 is a schematic diagram of a system capable of real-time media communication consistent with an example embodiment of the present invention.

FIG. 1 is a schematic diagram of a system 10 capable of real-time media communication consistent with an example of the present invention. As shown, the system 10 may include a camera 12 and a mobile networked device (MND) 14, which may provide video capture services and network communication services, respectively. The system 10 may further include a mobile streaming adaptor (MSA) 16 that may provide communication between the camera 12 and the MND 14. In an exemplary embodiment, the MND 14 may be configured to communicate with a network 18, which may be a mobile network or a data network in some examples. The network 18 may enable the MND 14 to communicate with a service platform 20 which may thereafter provide media content to a communication device 22. In an exemplary embodiment, the MND 14 may be embodied as a mobile phone, cell phone, digital player, personal digital assistant (PDA), or other mobile communication terminal capable of connection to the service platform 20 via wired connections or wireless connections provided via the network 18. The communication device 22 may be a personal computer (PC), notebook computer, or other type of terminal capable of accessing the network 18. The camera may be a digital camera, digital video camera, or any other type of device capable of capturing video data.

In an exemplary embodiment, the wireless connections may include third generation (3G), Wireless Fidelity (WiFi) technology, and/or other communication mechanisms. WiFi may refer to a brand originally licensed by the WiFi Alliance to describe the underlying technology of wireless local area networks (WLAN) based on the IEEE 802.11 specifications. WiFi may be used for mobile computing devices, such as laptops, in LANs, and for more services, including Internet and Voice over IP (VoIP) phone access.

The service platform 20 may be a device or node such as a server or other processor. The service platform 20 may have any number of functions or associations with various services. For example, the service platform 20 may be a platform such as a dedicated server (or server bank) associated with a particular information source or service (e.g., a streaming video service), or the service platform 20 may be a backend server associated with one or more other functions or services. As such, the service platform 20 represents a potential host for a plurality of different services or information sources. In some embodiments, the functionality of the service platform 20 is provided by hardware and/or software components configured to operate in accordance with known techniques for the provision of information and services to users of communication devices. However, at least some of the functionality provided by the service platform 20 may be data processing and/or service provision functionality provided in relation to streaming video provided in accordance with embodiments of the present invention. Moreover, in some cases, the service platform 20 may include a streaming server unit (e.g., a computer, a workstation or a workstation computer for supporting streaming video services such as the remote streaming server unit 90 of FIG. 4).

The streaming server unit of the server platform 20 may be configured to process media content to or from the communication device 22 in real-time. As such, the streaming server unit may be configured to receive real-time media content information such as a location, link address and description of media content, and broadcast a message on the publishing of the real-time media content to subscribers based on streamed media provided thereto from the MND 14 (after capturing by the camera 12 and adaptation from the camera 12 to the MND 14 by the MSA 16). Alternatively, or additionally, the service platform 20 may be configured to provide a location of the streaming server unit to facilitate the provision of the real-time media content to subscribers. The streaming server unit may be configured to receive a request for connection thereto from the communication device 22 and receive real-time media content such as an audio, video, text, graphics or other media or any combination thereof from the MND 14 for provision to the communication device 22. In some cases, the streaming server unit may record real-time media content in a media file. As used herein, the term "streaming" may refer to a mode of multi-media processing which allows a user (e.g., at the communication device 22) to download multi-media content while playing the already downloaded portions of the multi-media content. Unlike a conventional "download-and-play" mode that only allows a user to play multi-media content when the whole multi-media content is downloaded, the "streaming" mode is able to support real-time multi-media processing.

The streaming server unit of the service platform 20 may include a plurality of internal modules for content receiving, a content dispatching, a content recording and a data storage. The modules may be implemented in hardware or software, depending on design complexity and operation speed requirements. The content receiving module may be configured to receive real-time media content transmitted from the MND 14 to the service platform 20. The content dispatching module may be configured to provide a location of real-time media content and dispatch the real-time media content to subscribers (e.g., at the communication device 22). The content recording module may be configured to record real-time media content transmitted from the MND 14. The data storage module may be configured to store the recorded media content.

In an exemplary embodiment, the camera 12 may capture high-quality live media content (e.g., video content). Since the camera 12 need not be a built-in camera of a mobile device (e.g., a camera phone), the camera 12 may, in some cases, be of a higher quality and/or have higher capability than a typical camera phone. For example, the camera 12 could be a commercially available camcorder or other video capturing device. Contrary to conventional camcorders, which typically require the user to connect the camcorder (or a memory device of the camcorder) to a personal computer in order to conduct processing and distribution of the recorded content, the camera 12 of embodiments of the present invention may be in communication with the MSA 16 in order to enable the media content from the camera 12 to be provided to the MND 14 for subsequent communication (via the network 18) to the service platform 20 and subscribers or other users employing devices such as the communication device 22 who may access the media content via the service platform 20. In this regard, the MSA 16 enables processing or adaptation of the media content received from the camera 12 so that the information processed by the MSA 16 may be provided to the MND 14 for communication to the network 18 without consuming MND 14 resources for the processing or adaptation of the media content.

Figure 2:
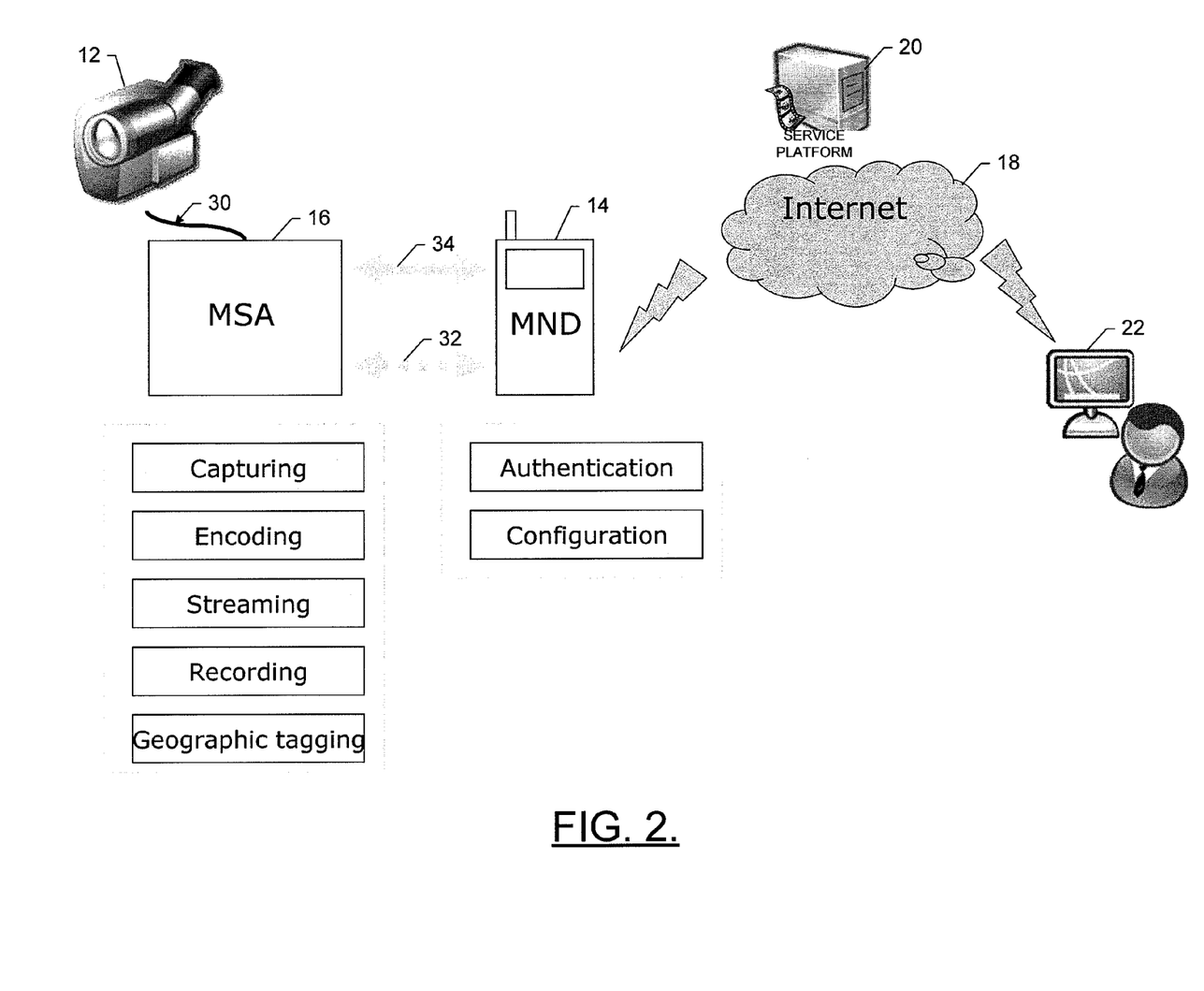
FIG. 2 illustrates an exemplary architecture for the system of FIG. 1 according to an exemplary embodiment of the present invention.

In an exemplary embodiment, the processing or adaptation of the media content by the MSA 16 may include a number of services, some examples of which are shown in FIG. 2. In this regard, FIG. 2 is an example of the system of FIG. 1 illustrating the system structure relative to some exemplary functions that may be performed by the MND 14 and the MSA 16. As shown in FIG. 2, the MSA 16 may receive media content 30 from the camera 12 (which in this example is a relatively high-quality camcorder). In some examples, the connection between the camera 12 and MSA 16 may be wired. However, wireless connections are also possible. After receiving the media content 30, the MSA 16 may then perform processing of the media content 30. The processing may include capturing, encoding, streaming, recording, geographic tagging and/or other services as described in greater detail below. The MSA 16 may then communicate the processed media content to the MND 14 via wireless links 32 (e.g., Bluetooth or the like) or wired links 34 (e.g., universal serial bus (USB) or the like). The MND 14 may then perform authentication and configuration services on the processed media content to provide the information to the network 18 (e.g., the Internet). The service platform 20 may then provide a streaming server unit for provision of the information in real-time or near real-time to the communication device 22, which may be manned by an audience of one or more monitoring individuals.

In an exemplary embodiment, the MSA 16 may not include a user interface in order to keep the MSA 16 a relatively simple and rugged device. Instead, the user interface for the MSA 16 may be provided by the MND 14. As such, for example, the MND 14 may include a communication module or software for providing user interface commands to the MSA 16. Given that the MND 14 has limited resources (e.g., limited battery life and processing capability), handling the processing of the media content 30 at the MSA 16 may provide a simple solution to enabling streaming of content in a real-time or near real-time fashion, while not draining MND 14 resources and thereby limiting the effectiveness of the MND 14 by requiring excessive recharging operations, which may take the device offline or limit mobility. Thus, given that each of the camera 12, the MND 14, and the MSA 16 have their own respective processors and batteries, the resource consumption associated with media content processing (e.g., capturing, encoding, streaming, recording, geographic tagging, etc.) may be handled by the MSA 16 so that resources of the camera 12 and the MND 14 are preserved for their respective purposes. This may be of particular significance for the MND 14, since MNDs such as mobile phones and PDAs are commonly used for many other tasks and thus it may be desirable to increase the ability of the MND 14 to handle other tasks while still maintaining itself as a control and communication apparatus for the MSA 16.

In some embodiments, the camera 12 may be hand-held. However, the camera 12 could alternatively be mounted on a vehicle, robot or even attached on the person of a particular individual. For example, the camera 12 could be mounted to headgear (e.g., a hat, helmet, glasses, headband, or the like) or clothing (e.g., collar, lapel, or the like). The MND 14 and the MSA 16 may each also be hand-held or attached to a vehicle or the person of an individual. In some embodiments, the camera 12, the MSA 16 and the MND 14 may each be associated with a single person (e.g., carried by one person). However, in some embodiments, one or more of the camera 12, the MSA 16 and the MND 14 may be worn or handled by different individuals. Particularly in the embodiment in which one person or entity carries all three of the camera 12, the MSA 16 and the MND 14, that person or entity may have a robust capability for providing streaming information to a person monitoring the communication device 22. Thus, for example, a police officer or military operator may have robust capability for providing supervisors or coordinators that are remotely located with live information regarding current conditions at a remote location. Alternatively, rescue personnel, repair technicians, surveillance operatives and others may have an ability to provide real-time video for assessment by superiors, specialists, analysts, experts or other remotely located individuals. As yet another alternative, family, friends or business people can provide information to others related to important or fan events, training, or occurrences.

The wireless links or connections referred to herein may be made by any of a number of mobile or wireless/IP network connection mechanisms that may employ general mobile/wireless network techniques such as Global System for Mobile Communications (GSM) and Code Division Multiple Access (CDMA) as second-generation (2G) protocols, General Packet Radio Service (GPRS) as second and a half generation (2.5G) protocols, wireless local area network (WLAN), and Wideband Code Division Multiple Access (WCDMA), Universal Mobile Telecommunications System (UMTS), Enhanced Data Rate for GSM Evolution (EDGE), Wireless EDGE (WEDGE), CDMA2000, Time Division-Synchronous Code Division Multiple Access (TDSCDMA) as third-generation (3G) and 3G-related protocols, High-Speed Downlink Packet Access (HSDPA) as third and a half generation (3.5G) protocols and Worldwide Interoperability for Microwave Access (WiMAX).

The above-mentioned GSM may refer to a standard for mobile phones. CDMA may refer to a form of multiplexing, a multiple access scheme and a digital cellular phone system based on the multiple access scheme. GPRS may refer to a mobile data service available to users of, for example, GSM. A 2G cellular system combined with GPRS may often be described as "2.5G," that is, a technology between the 2G and 3G. WLAN may refer to a wireless network configured to link two or more computers without using wires. WCDMA may refer to a type of 3G cellular network, and technically may refer to a wideband spread-spectrum mobile air interface that utilizes the direct sequence CDMA signalling method to achieve a higher speed transmission than the TDMA signaling method employed by GSM networks. UMTS may refer to one of the 3G mobile phone technologies. UMTS may sometimes be termed 3GSM, emphasizing the combination of the 3G nature of the technology and the GSM standard which it was designed to succeed. EDGE or WEDGE may refer to a digital mobile phone technology that allows for increased data transmission rate and improved data transmission reliability. The EDGE or WEDGE may generally be classified as a 2.75G network technology.

Furthermore, CDMA2000 may refer to a family of 3G mobile telecommunications standards that use CDMA, a multiple access scheme for digital radio, to send voice, data, and signalling data such as a dialed telephone number between mobile phones and cell sites. TDSCDMA may refer to a 3G mobile telecommunications standard based on spread spectrum CDMA technology. HSDPA may refer to a 3G mobile telephone protocol, which may provide a smooth evolutionary path for UMTS-based networks allowing for higher data transfer speeds. WiMAX may be defined as Worldwide Interoperability for Microwave Access by the WiMAX Forum, formed in June 2001 to promote conformance and interoperability of the IEEE 802.16 standard.

Figure 3:
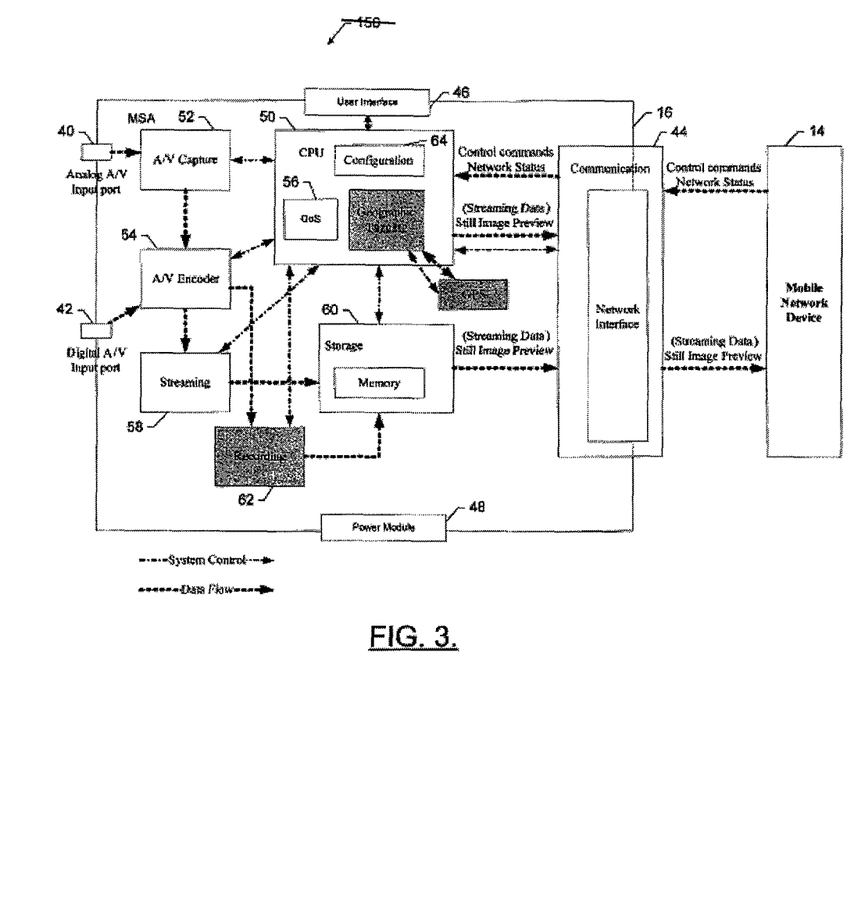
FIG. 3 is an exemplary block diagram of an exemplary architecture of a mobile streaming adaptor according to one example embodiment.

A more detailed discussion of examples of the MSA 16 and MND 14 will now be provided. Turning now to FIG. 3, which illustrates an exemplary architecture of the MSA 16 according to one example embodiment, the MSA 16 may include a variety of modules, devices, components or parts. Some of these modules, devices, components and parts will be described by way of example and not of limitation as FIG. 3 merely shows one exemplary architecture. Thus, alternative embodiments may include additional components to those shown in FIG. 3. Moreover, in some examples, one or more of the components of FIG. 3 may optionally be removed or replaced with another component.

As shown in FIG. 3, the MSA 16 according to an exemplary embodiment may include several external interfaces. For example, the MSA 16 may include one or more a video ports (e.g., analog A/V input port 40 and digital A/V input port 42). The video ports may be configured to support input received from a video camera (e.g., camera 12) in either analog or digital formats. In some cases, the video port may include separate video and audio ports to receive visual and audio signal data, respectively. The video port may be configured to support either wired or wireless input from the video camera.

The MSA 16 may also include a communication module (e.g., digital communication port 44) for interfacing with the MND 14. The communication module may accept control commands from the MND 14 and may also provide encapsulated streaming data to the MND 14 for provision of such data to the network 18 (e.g., the Internet). The communication module may be either wired or wireless and may be embodied as a single communication port or a plurality of communication ports. Streaming data encapsulated and communicated to the MND 14 may be encapsulated into IP packets.

Although not required, in some embodiments, the MSA 16 may include an external interface in the form of a user interface 46. The user interface 46 may be configured to receive an indication of a user input and/or to provide an audible or visual output to the user. As such, the user interface 46 may include, for example, one or more selection buttons and a display (e.g., including a liquid crystal display or lights). In some cases, the user interface 46 may include switches or buttons for changing or confirming selections and/or for turning power on/off. Other customized switches or buttons may also be supported. In an exemplary embodiment, the MSA 16 may include no user interface, such that all interface commands are provided by the MND 14. However, in an exemplary embodiment in which the MSA 16 includes the user interface 46 and is capable of communication with a plurality of different MNDs, the user interface 46 may display one or more MND identifiers from which the user may select one with which to communicate for the provision of processed data thereto. Moreover, in some embodiments, the user interface 46 may provide an ability to view a current video input received from the camera 12 to enable a user to preview the data being communicated to the MND 14. In an example embodiment, the user interface 46 may be used to accept a connection request from the MND 14.

In an exemplary embodiment, the MSA 16 may further include a power module 48. The power module 48 may include or be in communication with a battery or batteries that may provide power to the MSA 16. The battery or batteries may be standard replaceable batteries or, in some cases, may include a rechargeable battery pack. As such, the power module 48 may include a external power supply port for providing temporary power and/or for charging the rechargeable battery pack.

The MSA 16 may also include a number of internal modules or components. For example, the MSA 16 may include a processor (e.g., CPU module 50). The processor may be embodied in a number of different ways. For example, the processor may be embodied as various processing means such as a processing element, a coprocessor, a controller or various other processing devices including integrated circuits such as, for example, an ASIC (application specific integrated circuit), an FPGA (field programmable gate array), a hardware accelerator, or the like. In an exemplary embodiment, the processor may be configured to execute instructions stored in a memory device or otherwise accessible to the processor. By executing stored instructions or operating in accordance with hard coded instructions, the processor may control the operation of the MSA 16 by communicating with, coordinating the operation of and, in some cases, controlling other components or modules of the MSA 16. As such, whether configured by hardware or software methods, or by a combination thereof, the processor may represent an entity capable of performing operations according to embodiments of the present invention while configured accordingly.

In some embodiments, the MSA 16 includes a data capture module (e.g., A/V capture module 52). The data capture module may receive incoming data from the analog A/V input port 40. The data capture module may be any means including a device or circuitry embodied in hardware, software or a combination of hardware and software that is configured to encode analog signals into digital data. In some case, the data capture module may be an independent component. However, in some embodiments, the data capture module may be a part of or controlled by the processor.

In an exemplary embodiment, the MSA 16 includes a codec module (e.g., A/V encoder 54). The codec module may be any means including a device or circuitry embodied in hardware, software or a combination of hardware and software that is configured to encode or transcode media content received from the digital A/V input port 42 or digitized analog content received from the analog A/V input port 40 via the A/V capture module 52. In this regard, the codec module may be configured to encode or transcode digital signals or data (e.g., including either or both of visual and audio signals or data) into a formal used or preferred by the MND 14. As with the data capture module, the codec module may be an independent component or may be a part of or controlled by the processor.

In some cases, the processor may include or control a quality of service (QoS) module 56. The QoS module 56 may accept commands from the MND 14 regarding the control of transmission of streaming packets and of encoding quality. The QoS module 56 may provide control with respect to buffer management and rate control or to control the encoder parameters based on the received commands. In an exemplary embodiment, the QoS module 56 may be a function of the processor implemented through control of the encoder module and the communication module.

The MSA 16 according to this example also includes a streaming module 58. The streaming module may be any means including a device or circuitry embodied in hardware, software or a combination of hardware and software that is configured to encapsulate streaming packets. In particular, the streaming module 58 may be configured to encapsulate digital data received from the encoder module into IP packets. In some cases, the streaming module 58 may be a separate component, but in other embodiments the streaming module 58 may be a part of or controlled by the processor.

In an exemplary embodiment, the MSA 16 further includes a storage module 60. The storage module 60 may include, for example, volatile and/or non-volatile memory. The storage module 60 may be configured to store information, media content, instructions or the like. For example, the storage module 60 could be configured to buffer data for processing by the processor or prior to transmission. Additionally or alternatively, the storage module 60 could be configured to store instructions for execution by the processor. As yet another alternative or additionally, the storage module 60 may store packets under encoding or encapsulating. The storage module 60 may be an integrated part of the MSA 16 or may be a removable memory device.

In some cases, the storage module 60 may further include a recording module 62. However, in other embodiments, as shown in FIG. 3, the recording module 62 may be a separate module or device. The recording module 62 may be configured to record captured video content into the storage module 60. In this regard, for example, the recording module 62 may be part of or controlled by the processor. The media content recorded by the recording module 62 may be recorded as real-time media content in a media file in a format such as, for example, 3GP, MP4 and AVI. Recording real-time media content in the recording module 62 may offer a chance to a user to keep the content for off-line uploading if the network connection is not available and the recorded A/V quality may be much higher the streamed A/V and independent to network status.

In some embodiments, the processor may also include (or otherwise control) a configuration module 64. The configuration module 64 may accept MSA configuration commands (e.g., from the user interface of the MND 14) and may also accept streaming server configuration information (e.g., also from the MND 14). The processor may write configuration information accepted from the configuration module 64 and store the information in the storage module 60. As such, in some embodiments, the configuration module 64 may be a part of or controlled by the processor.

In an exemplary embodiment, the MSA 16 may include other optional modules or components such as a positioning module (e.g., GPS module 66) and/or a geographic tagging module 68. The positioning module may include a GPS sensor, an assisted global positioning system (AGPS) sensor, Galileo sensor, pedometer, inertial sensor and/or the like. As such, the positioning module may be capable of determining a location of the MSA 16, such as, for example, longitudinal and latitudinal directions of the MSA 16, or a position relative to a reference point such as a destination or start point. Meanwhile, the geographic tagging module 68 may receive geographic information (e.g., from the GPS module 66 or from the camera 12 or MND 14) and relate the geographic information to recorded or streamed data. In some cases, the positioning module and/or the geographic tagging module 68 may also be a part of or controlled by the processor.

Thus, according to an exemplary embodiment, the MSA 16 may generally include a processor (e.g., the central processing unit (CPU) 50) configured to receive media content from a remote camera, process the received media content by capturing, encoding and encapsulating the media content at a mobile electronic device, and stream the encapsulated media content to a mobile networked device for communication of the encapsulated content to a streaming server for real-time distribution to a communication device. In some embodiments, the processor is configured to process the received media content by processing the media content based on user instruction provided via a user interface of the mobile networked device. In such embodiments, the apparatus may lack a user interface of its own. In alternative embodiments, the processor may be configured to process the received media content by processing the media content based on a preset configuration or by processing the received media content in real-time based on quality of service parameters provided by the mobile networked device. In this regard, the MSA 16 may include a quality of service module configured to determine network congestion status and alter processing based on the determined status or receive such status information from a quality of service module of the mobile networked device. In some cases, the processor is configured to stream the encapsulated media content by providing the encapsulated media content to the mobile networked device for wireless communication of the encapsulated media content to a streaming server unit configured to distribute the media content to the communication device. In other cases, the MSA 16 includes a user interface for providing a preview of data to be provided to the mobile networked device.

Figure 4:
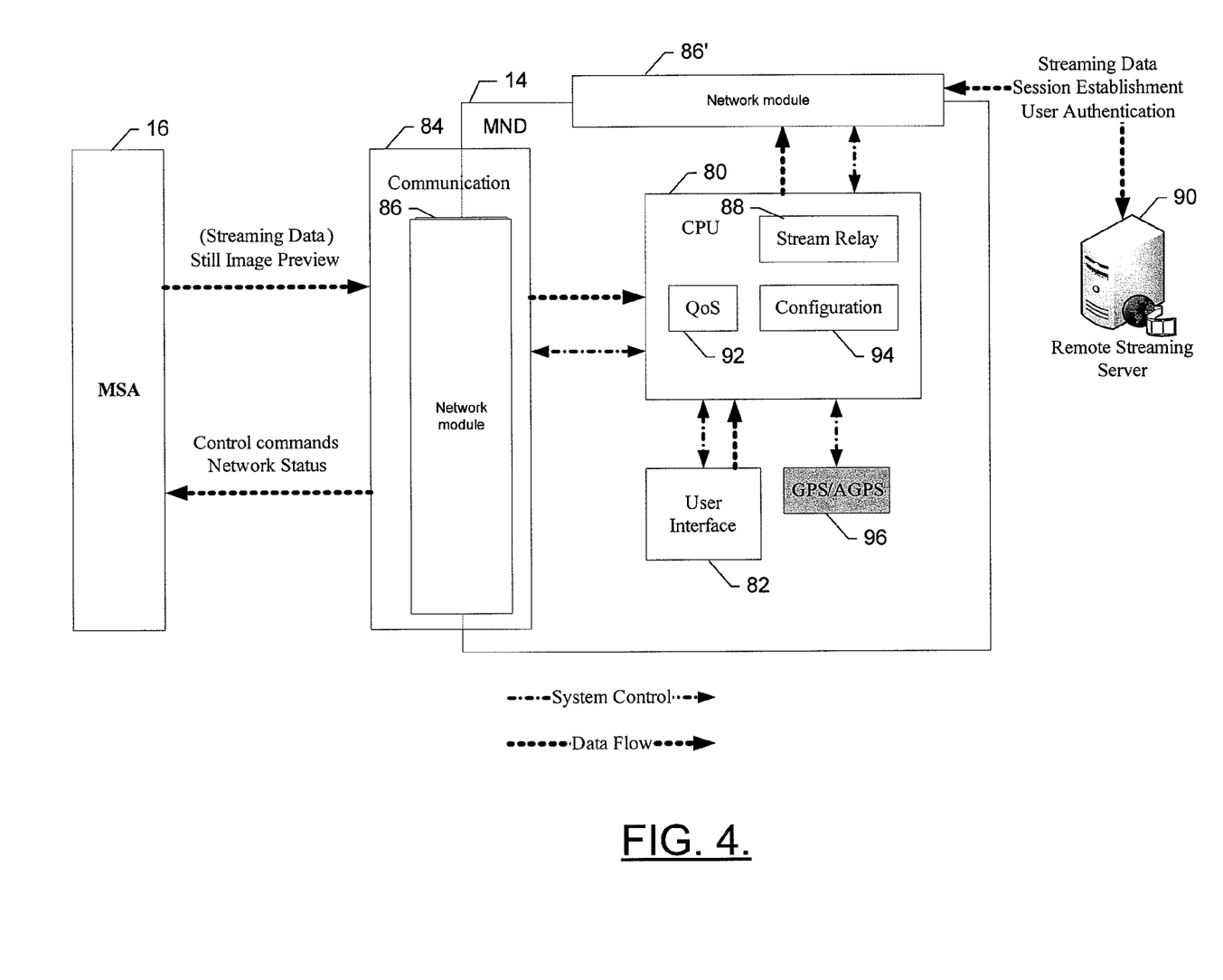
FIG. 4 is an exemplary block diagram of an exemplary architecture of a mobile networked device according to one example embodiment.

FIG. 4 is an exemplary block diagram of an exemplary architecture of the MND 14 according to one example embodiment. As shown in FIG. 4, the MND 14 may include a processor or controller (e.g., CPU 80). As with the MSA 16, the controller of the MND may be embodied in a number of different ways. For example, the controller may be embodied as various processing means such as a processing element, a coprocessor, a processor or various other processing devices including integrated circuits such as, for example, an ASIC (application specific integrated circuit), an FPGA (field programmable gate array), a hardware accelerator, or the like. In an exemplary embodiment, the controller may be configured to execute instructions stored in a memory device or otherwise accessible to the controller. By executing stored instructions or operating in accordance with hard coded instructions, the controller may control the operation of the MND 14 by communicating with, coordinating the operation of and, in some cases, controlling other components or modules of the MND 14. As such, whether configured by hardware or software methods, or by a combination thereof, the controller may represent an entity capable of performing operations according to embodiments of the present invention while configured accordingly. In some embodiments, the controller may be configured to communicate with a remote streaming server (e.g., the streaming server unit at the service platform 20) and the MSA 16. The processor may be configured to authenticate a user and set up a streaming distribution session. In some cases, the processor may also include a memory module for storing information and/or instructions for enabling MND 14 operation in accordance with exemplary embodiments of the present invention.

In an exemplary embodiment, the MND 14 includes a user interface 82. The user interface 82 may be in communication with the controller to receive an indication of a user input at the user interface 82 and/or to provide an audible, visual, mechanical or other output to the user. As such, the user interface 82 may include, for example, a keyboard, a mouse, a joystick, a display, a touch screen, a microphone, a speaker, or other input/output mechanisms. As indicated above, in some cases, user input commands for controlling the operation of the MSA 16 may be provided via the user interface 82 of the MND 14.

The MND 14 may also include a communication module 84 comprising a hardware-based interface for communication with the MSA 16 via either wired or wireless communication mechanisms. In some cases, the communication module 84 may include a network module 86 comprising a hardware-based interface for connecting to a remote server (e.g., the streaming server unit of the service platform 20) through the network 18 (e.g., an IP network). However, the network module 86 could alternatively be a separate device (e.g., as shown by network module 86' in FIG. 4).

The MND 14 may further include a stream relay module 88. The stream relay module 88 may be any means including a device or circuitry embodied in hardware, software or a combination of hardware and software that is configured to perform the corresponding functions of the stream relay module 88 as described below. In some cases, the stream relay module 88 may be a portion of or controlled by the controller. However, in other embodiments, the stream relay module 88 may be a separate module. The stream relay module 88 may be configured to set up sessions with the service platform 20 (e.g., via a remote streaming server unit 90 forming a portion of the service platform 20) and provide commands to the MSA 16 regarding streaming data to the MND 14. In this regard, the stream relay module 88 may be configured to send commands to the MSA 16 directing the MSA 16 to start encoding and/or transmitting streaming data (e.g., encapsulated packets) to the MND 14. The stream relay module 88 may then relay received streaming packets to the service platform 20 via the network 18. In some cases, the relayed packets may include modifications. However, in alternative embodiments, the streamed packets may be unmodified.

In some embodiments, the MND 14 may further include a QoS module 92 and a configuration module 94, which may be configured to communicate with corresponding modules of the MSA 16. The QoS module 92 may be any means including a device or circuitry embodied in hardware, software or a combination of hardware and software that is configured to receive system status reports (e.g., from the remote streaming server unit 90) or detect network status and communicate with the MSA 16 regarding video capture and encoding parameters. As such, the QoS module 92 may be configured to provide commands to the MSA 16 to update the MSA 16 with respect to communication parameters for communication between the MSA 16 and the MND 14. Thus, for example, if bandwidth is limited, the QoS module 92 may direct the MSA 16 to provide lower-quality data, while if more bandwidth becomes available, the QoS module 92 may direct the MSA 16 to provide higher-quality data. The configuration module 94 may be any means including a device or circuitry embodied in hardware, software or a combination of hardware and software that is configured to accept user inputs provided by the user interface 82 and/or retrieve stored configuration information from the MSA 16. In some embodiments, either or both of the QoS module 92 and the configuration module 94 may be portions of or controlled by the controller. In an exemplary embodiment, the MND 14 may also include a GPS/AGPS module 96 for providing geographic information.

Thus, according to an exemplary embodiment, the MND 14 may include a controller configured to provide control commands to a mobile electronic device receiving media content from a remote camera regarding processing of the received media content at the mobile electronic device. The processing may include capturing, encoding and encapsulating the media content. The controller may be further configured to receive the processed media content, and stream the processed media content to a streaming server for real-time distribution to a communication device. In some embodiments, the MND 14 may further include a user interface through which the control commands are provided and/or through which a preview of data to be provided to the communication device may be viewed. In some cases, the MND 14 may further include a quality of service (QoS) module configured to determine network congestion status and issue the control commands based on the determined status. In an exemplary embodiment, the controller is configured to stream the media content wirelessly to the streaming server configured to distribute the media content to the communication device.

Figure 5:
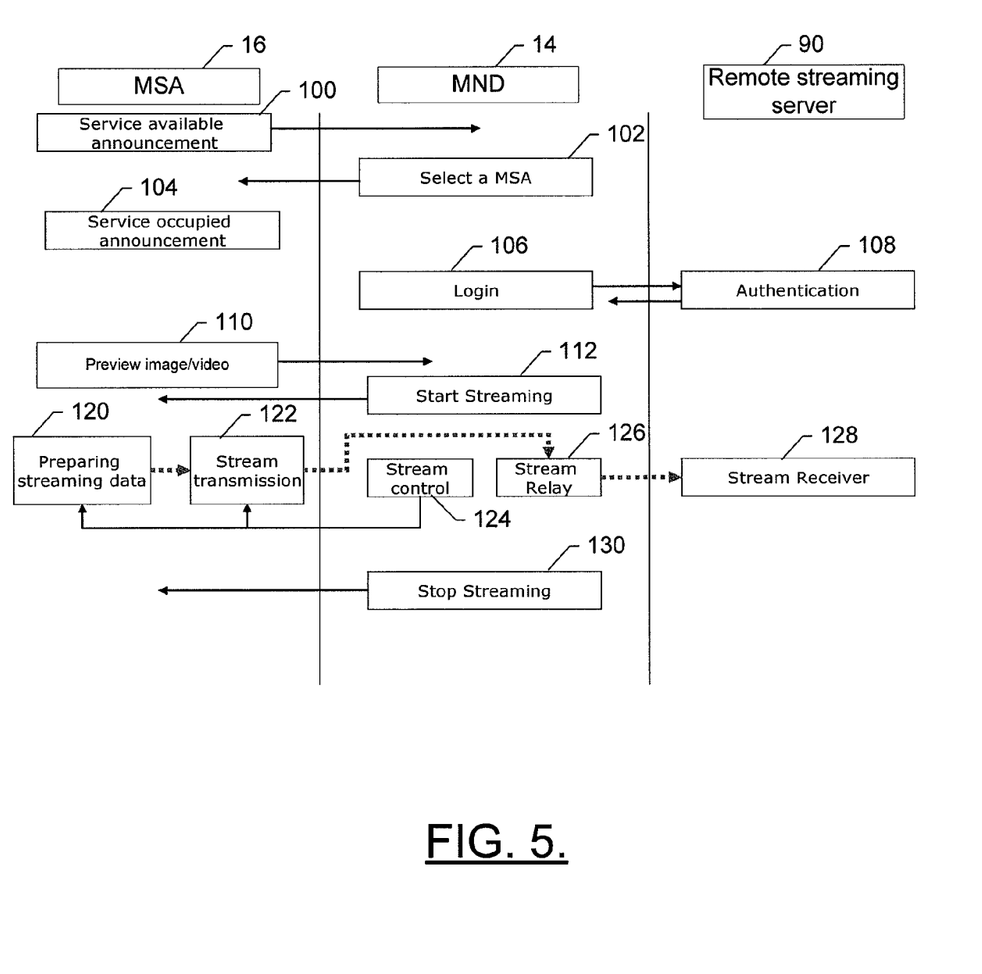
FIG. 5 illustrates a block diagram of a process flow for an exemplary embodiment of the present invention.

FIG. 5 illustrates a block diagram of a process flow for an exemplary embodiment of the present invention. In this regard, as shown in FIG. 5, the MSA 16 may initially provide a service available announcement to the MND 14 at operation 100. The service available announcement may be the result of an active lookup operation initially conducted by the MND 14, or may be initiated automatically by the MSA 16 in response to power up and/or connection with the MND 14. In this regard, the MSA 16 may have a preferred MND identity associated therewith and, upon power up, may attempt to connect with an MND having the preferred identity. In some cases, once the MSA 16 detects the MND having the preferred identity, the MSA 16 may not be able to accept a linking request from another MND. In some cases, if multiple MSAs are available at the MND 14, the MND 14 may select one of the MSAs via the MSA selection shown at operation 102. Once selected, the selected MSA (e.g., MSA 16) may issue a service occupied announcement at operation 104 indicating that the MSA 16 is no longer available to communicate with other MNDs. After the MND 14 connects to the MSA 16, the MND 14 may connect to the service platform 20 (e.g., the remote streaming server unit 90) at operation 106 to execute user authentication at operation 108. The authentication data and the profile of the remote streaming server unit 90 may be input by the user at the user interface 84, may be retrieved from stored user authentication data at the MSA 16, or may be retrieved from stored data at the MND 14.

The connection between the MND 14 and the MSA 16 may be a Transmission Control Protocol (TCP) connection. In some cases, two TCP links may be established including one link for control commands from the MND 14 to the MSA 16 and MSA status reports to the MND 14 and the other link for MSA transmissions of streaming data. However, in some cases, the two links may be integrated into one TCP link.

In an exemplary embodiment, the MSA 16 may be configured to detect whether the camera 12 or another audio or video device is connected to an input port of the MSA 16. If no camera or other audio or video device is available, the MSA 16 may acknowledge or otherwise inform the MND 14 that video capture and encoding features are not currently available. Determinations regarding input availability may be done at any time.

After the MSA 16 determines that a video source (e.g., the camera 12) is ready and the link between the MSA 16 and the MND 14 is ready, the MSA 16 may, in some cases, send a preview to the MND 14 for confirmation at operation 110. The preview may be a still image or video in some embodiments. If preview image is provided (or after the connection is ready if no preview image is provided), the MND 14 may set up a streaming connection with the service platform 20 (e.g., the remote streaming server unit 90) to enable the distribution of streaming packets to the service platform 20. The MND 14 may then direct the capture, encoding, and encapsulation of media content by the MSA 16 at operation 112. In some cases, the direction may be provided to direct performance of the MSA 16 in accordance with a predetermined or preset profile. The preset profile can be stored in the MND 14, the MSA 16, or at the service platform 20. As such, operation 112 may serve signaling the MSA 16 to begin streaming encapsulated packets to the MND 14 for transmission to the service platform 20 (and perhaps also to the communication device 22) via the network 18. A user determined or preset profile may direct recording of video data locally in the MSA 16. The user or preset profile may also include geographic information combined with recorded video data for future reference. The geographic information may be provided, for example, from the GPS module 66 of the MSA 16 or the GPS/AGPS module 94 of the MND 14.

During operation, the MSA 16 may begin encoding and preparing streaming data at operation 120 in response to receiving a respective command from the MND 14. The MSA 16 may then continue to transmit streaming data at operation 122 in response to stream control from the MND 14 at operation 124. The stream control provided from the MND 14 may also include commands related to pausing, resuming or stopping encoding and streaming. Such commands may be provided by an application or software module for providing user interface commands directed to controlling operation of the MSA 14 via the user interface 82. The MSA 16 may also tune encoding parameters according to QoS information provided from the MND 14.

The MND 14 may receive streaming data from the MSA 16 and relay the streaming data at operation 126 on to the service platform 20 at which location the streaming data may be received at operation 128. The MSA 16 may continue encoding and streaming data to the MND 14 until such time as the MSA 16 receives a command to stop streaming from the MND 14 as shown at operation 130. In some cases, the MSA 16 may continue encoding work and store encoded data in the storage module 60 even after receiving the command to stop streaming. A determination as to whether to continue encoding may be made based on user instructions or the preset profile.

Figure 6:
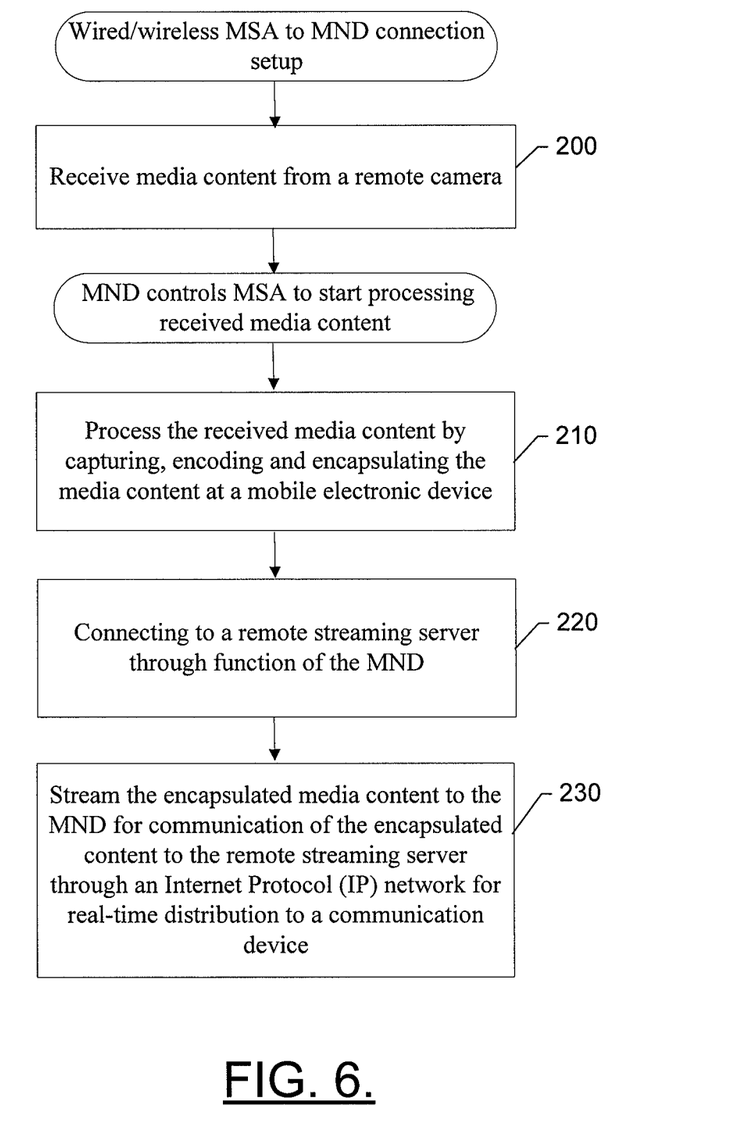
FIG. 6 is a flow diagram illustrating a method of providing a mobile streaming adaptor in accordance with an exemplary embodiment of the present invention.

FIG. 6 is a flowchart of a system, method and program product according to exemplary embodiments of the invention. It will be understood that each block or step of the flowchart, and combinations of blocks in the flowcharts, can be implemented by various means, such as hardware, firmware, and/or software including one or more computer program instructions. For example, one or more of the procedures described above may be embodied by computer program instructions. In this regard, in an example embodiment, the computer program instructions which embody the procedures described above are stored by a memory device and executed by a processor or controller. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). In some embodiments, the computer program instructions are stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

One embodiment of a method for providing a mobile streaming adaptor as provided in FIG. 6 may include operation 200 of receiving media content from a remote camera after wired or wireless MSA to MND connection setup. The method may further include processing the received media content by capturing, encoding and encapsulating the media content at a mobile electronic device at operation 210 and connecting to a remote streaming server through function of a mobile networked device at operation 220. The method may further include streaming the encapsulated media content to a mobile networked device for communication of the encapsulated content to a streaming server for real-time distribution to a communication device at operation 230.

In some embodiments, certain ones of the operations above may be modified or further amplified as described below. It should be appreciated that each of the modifications or amplifications below may be included with the operations above either alone or in combination with any others among the features described herein. In this regard, for example, processing the received media content may include processing the media content based on user instruction provided via a user interface of the mobile networked device, based on a preset configuration or processing the received media content in real-time based on quality of service parameters provided by the mobile networked device. In some embodiments, streaming the encapsulated media content comprises providing the encapsulated media content to the mobile networked device for wireless communication of the encapsulated media content to a streaming server unit configured to distribute the media content to the communication device.

In an exemplary embodiment, an apparatus for performing the method of FIG. 6 above may comprise a processor (e.g., the CPU 50) configured to perform some or each of the operations (200-230) described above. The processor may, for example, be configured to perform the operations (200-230) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-230 may comprise, for example, the CPU 50 and/or various respective ones of the modules for processing information as described in FIG. 3 above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Further, in describing representative embodiments of the present invention, the specification may have presented the method and/or process of the present invention as a particular sequence of steps or operations. However, to the extent that the method or process does not rely on the particular order of steps set forth herein, the method or process should not be limited to the particular sequence of steps or operations described. As one of ordinary skill in the art would appreciate, other sequences of steps or operations may be possible. Therefore, the particular order of the steps or operations set forth in the specification should not be construed as limitations on the preliminary claims below and the additional claims to be submitted later. In addition, the claims directed to the method and/or process of the present invention should not be limited to the performance of their steps or operations in the order written, and one skilled in the art can readily appreciate that the sequences may be varied and still remain within the spirit and scope of the present invention.

What is claimed is:

1. A mobile streaming adaptor comprising:
a processor embedded in the mobile streaming adaptor, the processor configured to:
   receive media content from a remote camera;
   capture, encode and encapsulate the received media content at the mobile streaming adaptor;
   generate a service available announcement for transmission to a mobile networked device, the service available announcement indicative of an availability of the mobile streaming adaptor to communicate with the mobile networked device;
   receive from the mobile networked device an indication of selection of the mobile streaming adaptor in response to the service available announcement;
   provide a service occupied announcement to indicate that the mobile streaming adaptor is no longer available to communicate with another mobile networked device and to prevent the mobile streaming adaptor from receiving a linking request from another mobile networked device;
   connect the mobile streaming adaptor to a remote streaming server in response to a valid authentication performed by the mobile networked device; and
   stream the encapsulated media content to the mobile networked device for communication of the encapsulated media content to the remote streaming server through a network for real-time distribution to a communication device,
   wherein both the service available announcement and the service occupied announcement are provided by the mobile streaming adaptor.

2. The mobile streaming adaptor of claim 1, wherein the processor is configured to process the received media content based on user instruction provided via a user interface of the mobile networked device.

3. The mobile streaming adaptor of claim 1, wherein the processor is configured to process the received media content by processing the media content based on a preset configuration.

4. The mobile streaming adaptor of claim 1, wherein the processor is configured to process the received media content by being configured to process the received media content in real-time based on quality of service parameters provided by the mobile networked device.

5. The mobile streaming adaptor of claim 1, wherein the processor is further configured to determine network congestion status and alter processing based on the determined status.

6. The mobile streaming adaptor of claim 1, wherein the processor configured to stream the encapsulated media content includes providing an IP-based, streaming media content to the mobile networked device for wireless communication of the encapsulated media content to a remote streaming server unit configured to distribute the media content to the communication device.

7. The mobile streaming adaptor of claim 1, further comprising a user interface configured to provide a preview of a current video input received from the camera to be provided to the mobile networked device.

8. A method comprising:
communicating from a mobile streaming adaptor with a remote mobile networked device through a network connection for accepting a control command;
accepting control commands at the mobile streaming adaptor from the remote mobile networked device to start a capturing, encoding and encapsulating process;
receiving media content at the mobile streaming adaptor from a remote camera;
capturing, encoding and encapsulating the received media content at the mobile streaming adaptor;
providing a service available announcement available for receipt by a mobile networked device, the service available announcement indicative of an availability of the mobile streaming adaptor to communicate with the mobile networked device;
providing a service occupied announcement to indicate that the mobile streaming adaptor is no longer available to communicate with another mobile networked device and to prevent the mobile streaming adaptor from receiving a linking request from another mobile networked device;
receiving from the mobile networked device an indication of selection of the mobile streaming adaptor in response to the service available announcement provided by the mobile streaming adaptor;
connecting the mobile streaming adaptor to a remote streaming server in response to a valid authentication performed by the mobile networked device; and
streaming the encapsulated media content from the mobile streaming adaptor to the mobile networked device for communication of the encapsulated media content to the remote streaming server through an Internet Protocol (IP) network for real-time distribution to a communication device,
wherein both the service available announcement and the service occupied announcement are provided by the mobile streaming adaptor.

9. The method of claim 8, wherein processing the received media content comprises processing the media content based on user instruction provided via a user interface of the mobile networked device.

10. The method of claim 8, wherein processing the received media content comprises processing the media content based on a preset configuration.

11. The method of claim 8, wherein processing the received media content comprises processing the media content in real-time based on quality of service parameters provided by the mobile networked device.

12. The method of claim 8, wherein streaming the encapsulated media content comprises providing the encapsulated media content to the mobile networked device for wireless communication of the encapsulated media content to a streaming server unit configured to distribute the media content to the communication device.

13. A computer program product comprising at least one non-transitory computer-readable storage medium having computer-executable program code instructions stored therein, the computer-executable program code instructions comprising:
program code instructions for receiving media content at a mobile streaming adaptor from a remote camera;
program code instructions for capturing, encoding and encapsulating the received media content at the mobile streaming adaptor;
program code instructions for providing a service available announcement available for receipt by a mobile networked device, the service available announcement indicative of an availability of the mobile streaming adaptor to communicate with the mobile networked device;
program code instructions for receiving from the mobile networked device an indication of selection of the mobile streaming adaptor in response to the service available announcement;
program code instructions for providing a service occupied announcement to indicate that the mobile streaming adaptor is no longer available to communicate with another mobile networked device and to prevent the mobile streaming adaptor from receiving a linking request from another mobile networked device;
program code instructions for connecting the mobile streaming adaptor to a remote streaming server in response to a valid authentication performed by the mobile networked device; and
program code instructions for streaming the encapsulated media content from the mobile streaming adaptor to the mobile networked device for communication of the encapsulated media content to the remote streaming server through an Internet Protocol (IP) network for real-time distribution to a communication device,
wherein both the service available announcement and the service occupied announcement are provided by the mobile streaming adaptor.

14. The computer program product of claim 13, wherein program code instructions for processing the received media content include instructions for processing the media content based on user instruction provided via a user interface of the mobile networked device.

15. The computer program product of claim 13, wherein program code instructions for processing the received media content include instructions for processing the media content based on a preset configuration.

16. The computer program product of claim 13, wherein program code instructions for processing the received media content include instructions for processing the received media content in real-time based on quality of service parameters provided by the mobile networked device.

17. The computer program product of claim 13, wherein program code instructions for streaming the encapsulated media content include instructions for providing the encapsulated media content to the mobile networked device for wireless communication of the encapsulated media content to a streaming server unit configured to distribute the media content to the communication device.

18. A computer program product comprising at least one non-transitory computer-readable storage medium having computer-executable program code instructions stored therein, the computer-executable program code instructions comprising:

program code instructions for providing control commands, at a controller of a mobile networked device, to a remote mobile streaming adaptor configured to receive media content from a remote camera, the control commands including capturing, encoding and encapsulating of the received media content at the mobile streaming adaptor;

program code instructions for receiving a service available announcement from the mobile streaming adaptor, the service available announcement indicative of the availability of the mobile streaming adaptor to communicate with the mobile networked device;

program code instructions for selecting the mobile streaming adaptor in response to the service available announcement to cause the selected mobile streaming adaptor issue a service occupied announcement;

program code instructions for receiving the service occupied announcement to indicate that the mobile streaming adaptor is no longer available to communicate with another mobile networked device and to prevent the mobile streaming adaptor from receiving a linking request from another mobile networked device;

program code instructions for providing connection of the mobile streaming adaptor to a remote streaming server in response to a valid authentication performed by the mobile networked device upon selection of mobile streaming adaptor;

program code instructions for receiving the processed media content as encapsulated Internet Protocol (IP)-based media content; and program code instructions for streaming the processed media content to the remote streaming server for real-time distribution to a communication device, wherein both the service available announcement and the service occupied announcement are provided by the mobile streaming adaptor.

19. The computer program product of claim 18 further comprising program code instructions for receiving the control commands by a user interface of the controller.

20. The computer program product of claim 18 further comprising program code instructions for determining network congestion status and issue the control commands based on the determined status.

21. The computer program product of claim 18 further comprising program code instructions for streaming the media content wirelessly to the streaming server configured to distribute the media content to the communication device.

22. The computer program product of claim 18 further comprising program code instructions for providing, by a user interface, a preview of a current video input received from the camera to be provided to the communication device.

23. The mobile streaming adaptor of claim 1, wherein the processor is configured to communicate the processed media content to the remote mobile networked device via at least one of a wireless link and wired link.

24. The mobile streaming adaptor of claim 1, wherein the processor is configured to stream the encapsulated media content to the mobile networked device based on a system status report, and wherein the system status report provided by the remote streaming server is about network status between the remote streaming server and the mobile networked device.

25. The computer program product of claim 18 further comprising program code instructions for receiving a system status report from the remote streaming server to determine network status between the remote streaming server and the mobile networked device.

26. The computer program product of claim 25 further comprising program code instructions for providing the system status report to the mobile streaming adaptor to configure the mobile streaming adaptor to determine network congestion status and alter processing based on the system status report.

* * * * *